(12) United States Patent
Gorey et al.

(10) Patent No.: US 9,521,539 B2
(45) Date of Patent: Dec. 13, 2016

(54) SYSTEM AND METHOD FOR SMALL CELL GATEWAY CORE NETWORK SELECTION IN A MULTI-OPERATOR CORE NETWORK ENVIRONMENT

(71) Applicant: CISCO TECHNOLOGY, INC., San Jose, CA (US)

(72) Inventors: Kevin L. Gorey, Reading (GB); Mark Grayson, Maidenhead (GB); Santosh Ramrao Patil, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 101 days.

(21) Appl. No.: 14/297,222

(22) Filed: Jun. 5, 2014

(65) Prior Publication Data
US 2015/0358807 A1 Dec. 10, 2015

(51) Int. Cl.
*H04W 8/12* (2009.01)
*H04W 48/18* (2009.01)
*H04W 84/04* (2009.01)
*H04W 60/04* (2009.01)

(52) U.S. Cl.
CPC .............. *H04W 8/12* (2013.01); *H04W 48/18* (2013.01); *H04W 60/04* (2013.01); *H04W 84/045* (2013.01)

(58) Field of Classification Search
None
See application file for complete search history.

(56) References Cited

U.S. PATENT DOCUMENTS

| 6,464,743 | B2 | 10/2002 | Kanno et al. |
| 7,330,452 | B2 | 2/2008 | Shiu et al. |
| 7,697,935 | B2 | 4/2010 | Guyot et al. |
| 7,768,983 | B2 | 8/2010 | Nylander et al. |
| 8,019,331 | B2 | 9/2011 | Khetawat et al. |

(Continued)

FOREIGN PATENT DOCUMENTS

| CN | 101820608 | 9/2010 | |
| EP | 2521401 A1 * | 11/2012 | ............ H04W 48/18 |

(Continued)

OTHER PUBLICATIONS

"ETSI TS-136-413 V8.10.0 (Jun. 2010) Technical Specification: LTE; Evolved Universal Terrestrial Radio Access Network (E-UTRAN); 51 Application Protocol (S1AP) (3GPP TS 36.413 version 8.10.0 Release 8);" © European Telecommunication Standards Institute 2010; Jun. 2010, 220 pages.

(Continued)

*Primary Examiner* — German J Vivana Di Prisco
(74) *Attorney, Agent, or Firm* — Patent Capital Group

(57) ABSTRACT

An example method is provided in one example embodiment and includes receiving a first communication from a user equipment (UE) for a subscriber associated with the first UE to a small cell network, wherein a plurality core networks (CNs) share resources for the small cell network; selecting a first CN from the plurality of CNs to provide services to the first subscriber via the small cell network based, at least in part, on a first Mobile Country Code (MCC) and a first Mobile Network Code (MNC) for the first subscriber; and storing, in at least one memory element, at least one association of the MCC and the MNC to the CN for use in subsequent requests from other UEs for subscribers to attach to the small cell network.

18 Claims, 9 Drawing Sheets

(56) References Cited

U.S. PATENT DOCUMENTS

| | | |
|---|---|---|
| 8,059,584 B2 | 11/2011 | Shiu et al. |
| 8,228,861 B1 | 7/2012 | Nix |
| 8,644,193 B2 | 2/2014 | Schein et al. |
| 9,282,465 B2 | 3/2016 | Grayson et al. |
| 2006/0183502 A1 | 8/2006 | Jeong et al. |
| 2008/0305768 A1 | 12/2008 | Nylander et al. |
| 2009/0325577 A1 | 12/2009 | Furtenback |
| 2011/0128890 A1 | 6/2011 | Schein et al. |
| 2011/0130144 A1 | 6/2011 | Schein et al. |
| 2011/0235546 A1 | 9/2011 | Horn et al. |
| 2012/0030373 A1 | 2/2012 | Yang |
| 2012/0094665 A1 | 4/2012 | Soliman et al. |
| 2012/0264443 A1 | 10/2012 | Ng et al. |
| 2012/0264466 A1* | 10/2012 | Vainola .............. H04W 48/18 455/500 |
| 2013/0028119 A1 | 1/2013 | Ben-Eli |
| 2013/0089073 A1 | 4/2013 | Zhu |
| 2013/0265954 A1* | 10/2013 | Dahlen .............. H04W 48/18 370/329 |
| 2013/0267229 A1 | 10/2013 | Gopalakrishnan |
| 2013/0303114 A1 | 11/2013 | Ahmad et al. |
| 2014/0031033 A1 | 1/2014 | Juang et al. |
| 2014/0120911 A1* | 5/2014 | Kozuka .............. H04W 60/00 455/435.1 |
| 2015/0312834 A1 | 10/2015 | Patil et al. |
| 2015/0365829 A1 | 12/2015 | Grayson et al. |

FOREIGN PATENT DOCUMENTS

| | | | |
|---|---|---|---|
| EP | 2863680 | 4/2015 | |
| EP | 2953405 | 12/2015 | |
| GB | 2510637 | 8/2014 | |
| WO | WO 2005/109936 | 11/2005 | |
| WO | WO 2013/064419 | 5/2013 | |
| WO | WO 2014124813 A1 * | 8/2014 | ............ H04W 48/18 |

OTHER PUBLICATIONS

"ETSI TS-124-008 V8.19.0 (Jul. 2013) Technical Specification: Digital cellular telecommunications system (Phase 2+); Universal Mobile Telecommunications System (UMTS); LTE; Mobile radio interface Layer 3 specification; Core network protocols; Stage 3 (3GPP TS 24.008 version 8.19.0 Release 8);" © European Telecommunication Standards Institute 2013; Jul. 2013; 594 pages.

"ETSI TS-123-251 V9.4.0 (Mar. 2011) Technical Specification: Universal Mobile Telecommunications System (UMTS); LTE; Network Sharing; Architecture and functional description (3GPP TS 23.251 version 9.4.0 Release 9);" © European Telecommunication Standards Institute 2011; Mar. 2011; 22 pages.

"ETSI TS-123-401 V9.5.0 (Jun. 2010) Technical Specification: Lte; General Packet Radio Service (GPRS) enhancements for Evolved Universal Terrestrial Radio Access Network (E-UTRAN) access (3GPP TS 23.401 version 9.5.0 Release 9);" ©European Telecommunication Standards Institute 2010; May 2010; 261 pages.

"ETSI TS-125-331 V9.16.0 (Oct. 2013) Technical Specification: Universal Mobile Telecommunications System *UMTS); Radio Resource Control (RRC); Protocol specification (3GPP Ts 25.331 version 9.16.0 Release 9);" © European Telecommunication Standards Institute 2013; Oct. 2013; pp. 679-698.

EPO Oct. 27, 2015 Search Report and Written Opinion from European Application Serial No. EP15170901.

"Draft 3GPP TS 23.251 V12.1.0 (Apr. 2014) Technical Specification: Group Services and System Aspects; Network Sharing; Architecture and Functional Description (Release 12);" $3^{rd}$ Generation Partnership Project, Interim_Draft_23251-C10, 650 Route Des Lucioles, F-06921 Sophia-Antipolis Cedex, France; Apr. 2011; 35 pages.

"3GPP TS 23.251 V10.1.0 (Mar. 2014) Technical Specification: $3^{rd}$ Generation Partnership Project; Technical Specification Group Services and System Aspects; Network Sharing; Architecture and functional description (Release 10)," $3^{rd}$ Generation Partnership Project, Mar. 2011, 25 pages.

3GPP TR-25.875 V5.0.0 (Mar. 2002) Technical Report: $3^{rd}$ Generation Partnership Project; Technical Specification Group Radio Access Network; Non Access Stratum (NAS) Node Selection Function (Release 5), $3^{rd}$ Generation Partnership Project, Mar. 2002, 12 pages.

"GPP-TR-37.803 V11.2.0 (Jun. 2013) Technical Report: $3^{rd}$ Generation Partnership Project; Technical Specification Group Radio Access Network; Universal Mobile Telecommunications System (UMTS) and LTE; Mobility Enhancements for Home Node B (HNB) and Home enhanced Node B (HeNB) (Release 11)," $3^{rd}$ Generation Partnership Project, Mar. 2013, 116 pages.

EPO Mar. 25, 2015 Extended Search Report and Written Opinion from European Application 14183969.6.

Qualcomm Incorporated: "Support of Inter PLMN Handover to CSG Cells," 3GPP Draft R2-114406, $3^{rd}$ Generation Partnership Project (3GPP), Mobile Competence Centre; 650, Route Des Lucioles; F-06921 Sophia-Antipolis Cedex; France.

* cited by examiner

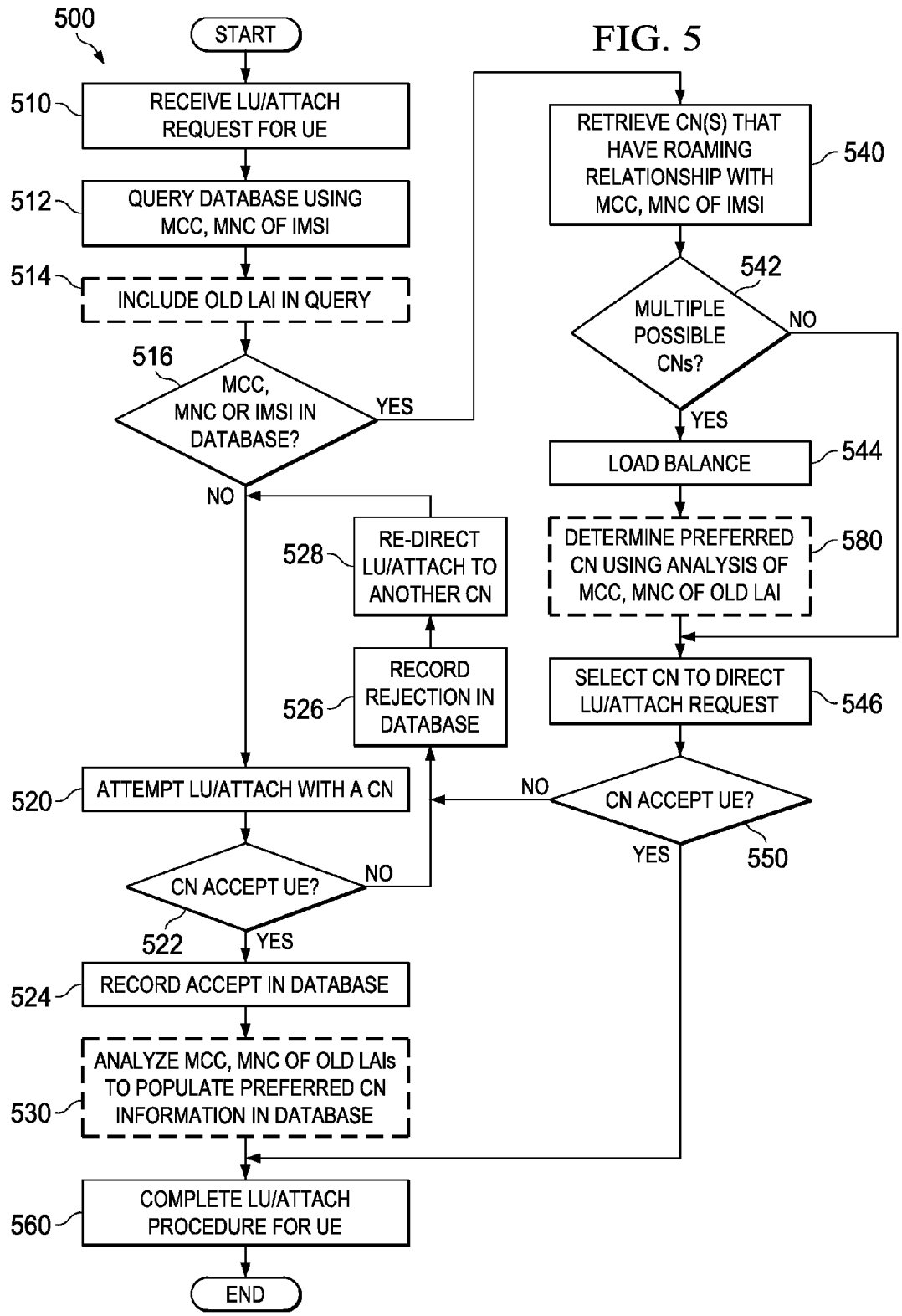

US 9,521,539 B2

SYSTEM AND METHOD FOR SMALL CELL GATEWAY CORE NETWORK SELECTION IN A MULTI-OPERATOR CORE NETWORK ENVIRONMENT

TECHNICAL FIELD

This disclosure relates in general to the field of communications and, more particularly, to a system and method for small cell gateway core network selection in a multi-operator core network (MOCN) environment.

BACKGROUND

Networking architectures have grown increasingly complex in communication environments. For example, small cells have gained notoriety due to their capabilities to connect wireless devices to a network. In general terms, small cell access points can operate in a licensed spectrum to connect user equipment to the network, often using broadband connections. For a mobile operator, small cell access points can offer improvements to both coverage and capacity, which is particularly applicable to indoor networking environments where macro cell networks typically suffer coverage limitations. Small cell access points can also offer an alternative networking architecture to deliver the benefits of scalable small cell deployments. However, there are significant challenges in managing selection of core network resources for certain user equipment (UE), particularly in the context multi-operator core networks (MOCNs) in which multiple core network operators can share small cell network resources.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 is a simplified flow diagram illustrating example operations associated with small cell gateway core network selection in a MOCN environment in accordance with one embodiment of the communication system.

DETAILED DESCRIPTION OF EXAMPLE EMBODIMENTS

Overview

A method for a communication network is provided in one example embodiment and may include receiving a first communication from a first user equipment (UE) for a first subscriber associated with the first UE to a small cell network, wherein a plurality core networks (CNs) share resources for the small cell network; selecting a first CN from the plurality of CNs to provide services to the first subscriber via the small cell network based, at least in part, on a first Mobile Country Code (MCC) and a first Mobile Network Code (MNC) for the first subscriber; and storing, in at least one memory element, at least one association of the first MCC and the first MNC to the first CN for use in subsequent requests from other UEs for subscribers to attach to the small cell network. In some cases, the method can include determining a last visited Public Land Mobile Network (VPLMN) for the first subscriber, wherein the last VPLMN comprises a second MCC and second MNC contained in the last VPLMN; selecting the first CN selected based additionally on the second MCC and second MNC contained in the last VPLMN for the first subscriber; and storing another association of the second MCC and the second MNC to the first CN, wherein the other association indicates a preferred selection of the first CN for use in subsequent requests from other UEs having a last VPLMN matching the last VPLMN determined from the first subscriber. In some cases the last VPLMN for the first subscriber can be determined from a location area identifier (LAI) received from the first UE.

In other cases, the method can include storing a record of CNs for which the first subscriber has been denied access, wherein the record is maintained according to the MCC and the MNC for the first subscriber. In yet other cases, the method can include receiving a second communication from a second UE for a second subscriber associated with the second UE to the small cell network; and selecting the first CN to provide services to the second subscriber based, at least in part, on the at least one association if a second MCC and a second MNC of the second subscriber match the first MCC and the first MNC of the first subscriber. In some instances, the first UE and the second UE can both be 3rd Generation Partnership Project (3GPP) pre-Release 6 UEs. In yet other instances, the first communication or the second communication can be at least one of: an attach request for at least one of the first UE and the second UE; and a location area update (LAU) for at least one of the first UE or the second UE. In yet other cases, the method can include updating the at least one stored association of the first MCC and the first MNC to the first CN if a subsequent UE having an MCC and MNC matching the first MCC and the first MNC is denied access to the first CN.

Example Embodiments

Figure 1:
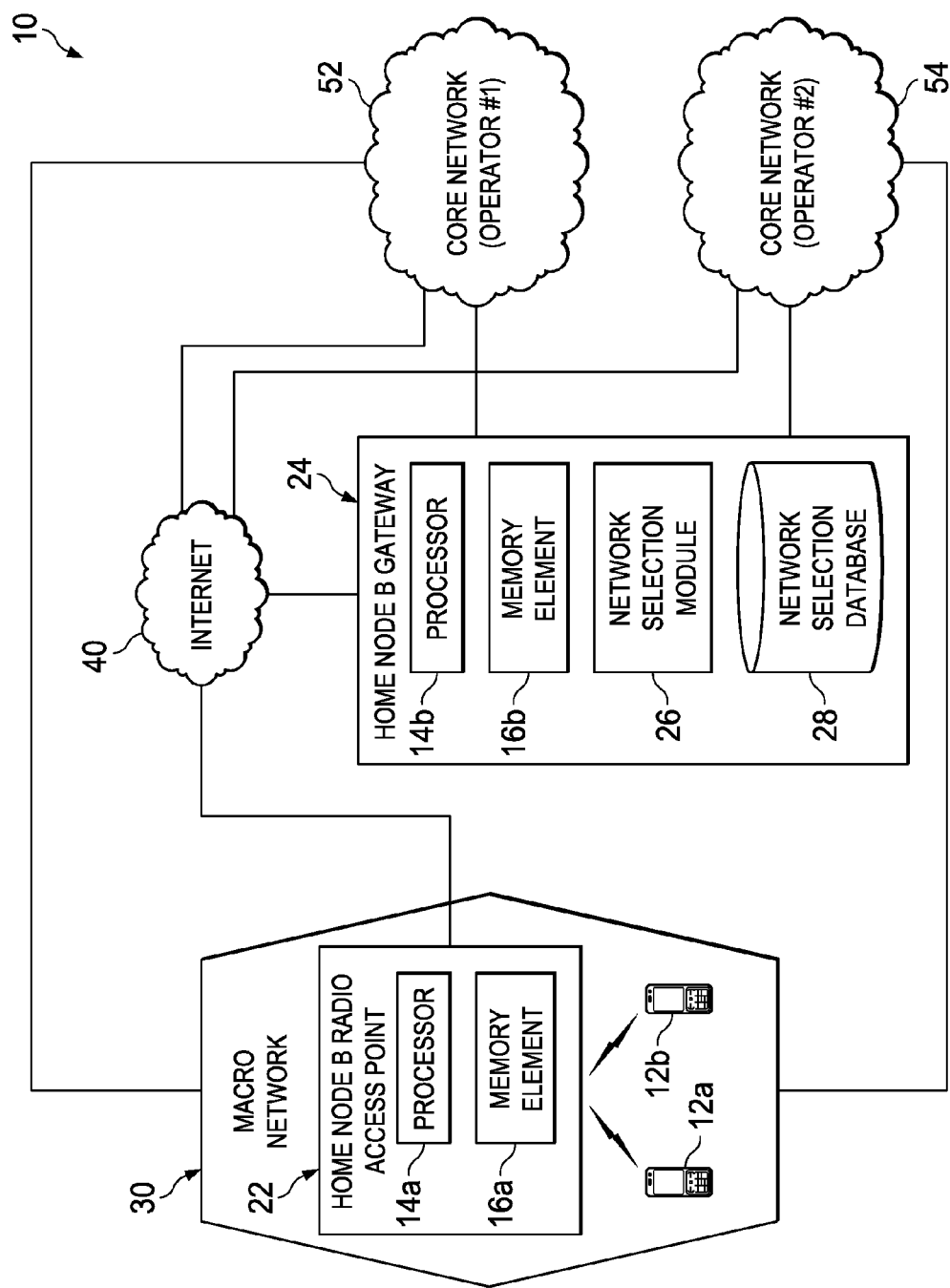
FIG. 1 is a simplified block diagram illustrating a communication system to facilitate small cell gateway core network selection in a MOCN environment according to one embodiment of the present disclosure.

Turning to FIG. 1, FIG. 1 is a simplified block diagram illustrating a communication system 10 to facilitate small cell gateway core network selection in a MOCN environment according to one embodiment of the present disclosure. This particular configuration may be tied to the 3rd Generation Partnership Project (3GPP) 2G and 3G architectures for General Packet Radio Service (GPRS) and Circuit Switched (CS) services. Alternatively, the depicted architecture may be applicable to other environments equally.

The example architecture of FIG. 1 may include user equipment (UE) 12a, 12b, a Home Node B (HNB) radio access point 22, a HNB gateway (HNB-GW) 24, a macro network 30, an internet 40, a first core network (CN) 52 and a second CN 54. As referred to herein in this Specification, a 'HNB radio access point' may be referred to interchangeably as a 'HNB access point', 'HNB', 'small cell radio access point', 'small cell access point', 'small cell', 'femtocell' or 'femto'. HNB 22 may have a logical connection to HNB-GW 24 via internet 40 to form a small cell network. Also shown in in FIG. 1, HNB 22, and HNB-GW 24 may each include a respective processor 14a-14b and a respective memory element 16a-16b. HNB-GW 24 may further include network selection module 26 and a network selection database 28.

Communication system 10 illustrates a MOCN environment. A first operator (e.g., operator #1) may provide services and resources via first CN 52 and macro network 30 to provide macro cellular/mobile coverage for UE 12a-b and second operator (e.g., operator #2) may provide services and resources through second CN 54 and macro network 30 to provide macro cellular/mobile coverage for UE 12a-b. Macro network 30 may include radio access network (RAN) equipment shared by the first and second operators and/or other operators in the system 10 and/or may include RAN equipment owned/operated individually by such operators. HNB 22 and HNB-GW 24 may also be shared between the first and second operators to provide small cell cellular/mobile coverage for UE 12a-b. As referred to herein in this Specification, a 'core network' may be referred to interchangeably as a 'service provider network'. In various instances, macro network 30 may include access networks such as GSM EDGE radio access network (GERAN), UMTS terrestrial radio access network (UTRAN), generally referred to as 3G.

Although only one HNB (e.g., HNB 22) is shown in FIG. 1, it should be understood that multiple HNBs may be deployed in communication system 10. The small cell network may be made up of multiple HNBs, including HNB 22, in order to provide 3G cellular/mobile coverage for the small cell network. In various embodiments, the small cell network may further include one or more Home eNode B (HeNB) radio access points (not shown) in order to provide 4G/LTE cellular/mobile coverage for the small cell network. HNB 22, as well as other HNBs in the small cell system, may be provisioned according to technical report 069 (TR-069) protocol using the TR-196 data model through an HNB Management System (HMS) (not shown) which may be in communication with HNB 22 and HNB-GW 24.

Each CN 52, 54 may include other elements, gateways, etc. that may make up 2G and 3G architectures for GPRS and CS services. For example, these elements may include, but not be limited to, one or more Mobile Switching Centers (MSCs), a Home Subscriber Server/Home Location Register (HSS/HLR), one or more serving GPRS support nodes (SGSNs), one or more gateway GPRS support nodes (GGSNs), one or more Policy and Charging Rules Functions (PCRFs) and/or one or more Authentication, Authorization and Accounting (AAA) elements. These elements, gateways, etc. may be included in CNs 52, 54 to provide various UE services and/or functions, such as, for example, to implement QoS on packet flows, to provide connectivity for UE 12a-b to external data packet networks, to provision CS voice routing, to provide enhanced services such as enhanced charging, stateful firewalls and/or traffic performance optimization (TPO), etc. These elements are not shown in CNs 50, 52 in order to highlight other features of communication system 10.

Before detailing some of the operational aspects of FIG. 1, it is important to understand common characteristics of small cell access points (APs) (e.g., HNBs, HeNBs, femtocells, etc.) as they generally operate in commercial architectures. The following foundation is offered earnestly for teaching purposes only and, therefore should not be construed in any way to limit the broad teachings of the present disclosure. In many network architectures, small cell APs can be deployed as autonomous units to improve reception in areas with poor coverage, or within buildings where coverage is reduced by the structure itself.

Essentially, small cell APs are fully featured base stations that can provide proximate coverage in a business (e.g., enterprise) and/or residential environment. Typically, small cell APs operate at lower radio power levels as compared to macro cell radio access networks (RANs). Small cell APs can be connected using a standard broadband digital subscriber line (DSL), internet or cable service into an operator's CN. Calls can be made and received, where the signals are sent (potentially encrypted) from the small cell AP via the broadband IP network to one of the service provider's main switching centers. Small cell APs can be provisioned to readily handle 8, 16, 32, etc. concurrent calls. Thus, a small cell AP (e.g., HeNB, HNB, etc.) generally operates as a mini tower for a proximate user. As used herein in this Specification, the terms 'user' and 'subscriber' may be used interchangeably.

Issues may arise with respect to inbound international roamer UEs and MOCN deployments, where multiple operators may share small cell network equipment, such as, for example, one or more HNBs and one or more corresponding HNB-GWs. MOCN deployments can serve 3GPP pre-Release 6 UEs and/or can operate under a 3GPP pre-Release 6 configuration, in which case post-Release 6 UEs may be configured to operate as pre-Release 6 UEs in response to a System Information Broadcast (SIB) indicating a pre-Release 6 network configuration. Note, as referred to herein in this Specification, reference to 3GPP pre-Release 6 UEs is meant to encompass both actual pre-Release 6 UEs and post-Release 6 UEs configured to operate as pre-Release 6 UEs. When handling in-bound international roaming situations for pre-Release 6 UEs in an MOCN environment, there may be instances where a network node selection function (NNSF) selects a forbidden Public Land Mobile Network (PLMN), e.g., a CN that does not have a roaming agreement, either directly or indirectly, with the inbound roamer UE's home network operator.

As referred to herein in this Specification, 'pre-Release 6' may be referred to interchangeably as 'pre-R6' or 'pre-Rel 6' and a 'PLMN' may be referred to interchangeably as a CN or, more generally, a 'network'. A given PLMN may be identified using a Mobile Country Code (MCC) and a Mobile Network Code (MNC). A home network for a given subscriber may also be identified using an MCC, MNC contained within an International Mobile Subscriber Identity (IMSI) for the subscriber associated with a given UE. The IMSI for a subscriber is typically stored on a Subscriber Identity Module (e.g., SIM card) housed within a subscriber's UE.

3GPP TS 23.251, section 7.1.4, defines a re-routing mechanism for pre-R6 UEs where, for a given pre-R6 UE, a radio network controller (RNC) for a macro network or a HNB-GW for a small cell network can retry a location update (LU) with multiple CN nodes before declaring a LU reject for the pre-R6 UE, which can lead to a forbidden HNB location area code (LAC) being stored by the UE, such that the UE may not attempt to attach to the forbidden HNB when the UE may subsequently (e.g., at another time) be within range of the HNB. The re-routing mechanism may involve querying CNs with an MCC and MNC for a subscriber to determine if a given CN has a roaming relationship with the subscriber (e.g., with the network service provider identified by the MCC, MNC of the subscriber) to provide resources/services to the subscriber.

However, not all equipment vendors may support the re-routing mechanism as defined in 3GPP TS 23.251. If a SGSN or mobile switching center (MSC) vendor doesn't support this rerouting mechanism (e.g., by rerouting related information elements (IEs) to multiple CNs or specially sending back an attach request to another CN in a reroute command) then an HNB-GW needs to store the location update/attach request message so that it can be sent to other CN nodes.

Consider, for example, a case of an airport HNB deployment at an arriving gate of the airport. In such a deployment, there may frequently be many inbound pre-R6 roamer UEs from the same network. Being able to avoid forbidden PLMNs for the inbound roamer UEs may be advantageous, since such would mean that the valuable inbound roamers could configure the HNB pre-R6 MOCN network as being forbidden upon a timeout. Although there exists the 3GPP re-routing mechanism for non-supported pre-R6 UEs, with femto deployments, if a MOCN environment is implemented with two or more operators then the re-routing mechanism for the LU/attach request could potentially cycle through multiple CN nodes for a pre-Rel 6 roamer user whose MCC and MNC doesn't match PLMNs configured for one or more CN nodes.

Thus, the HNB-GW could potentially have to retry with a number of CN nodes before receiving a LU accept from an appropriate CN node for a preferred roamer partner (e.g., another operator/partner that has roaming relationship/agreement with the user's home network operator) for the subscriber/user associated with the pre-R6 roamer UE. This can lead to inefficient use of network resources or, in some cases, configuring of a CN (e.g., PLMN) as forbidden for a pre-R6 UE where a location update/attach may timeout or lead to failure from UE side, depending on how much time UE waits for getting a successful location update/attach request response from a CN. Aside from the potential for inbound roamer timeouts (e.g., leading to forbidden PLMNs being stored by the roamers), an increase in location update/attach procedure time can also affect key performance indicators (KPIs), such as call setup time, etc.

In accordance with one embodiment, communication system 10 can overcome the aforementioned shortcomings (and others) by providing a re-routing mechanism for roamer pre-R6 UEs (e.g., UEs 12a-12b) that can be optimized at HNB-GW 24, via network selection module 26 and network selection database 28, by recording and/or tracking successful/unsuccessful routing information for previous roamer pre-R6 UEs. The solution may be particularly useful for international roaming situations. HNB-GW 24, via network selection module 26 and network selection database 28, may maintain a mapping table of successful CN node selection (e.g., one of CNs 52, 54, which has accepted a location update/attach request for a given pre-R6 roamer UE 12a-12b) and/or of a preferred roamer partner CN node selection of previous roamer pre-R6 UEs (e.g., UE 12a). HNB-GW 24 may map MCC, MNC information of subscribers associated with the pre-R6 roamer UEs with the successful/preferred CN node selections.

During operation, for example, when a given subsequent pre-R6 roamer UE, say, for example UE 12b, is within range of HNB 22 and is attempting to initiate a session, UE 12b may communicate an attach request to HNB 22. HNB 22 may request an IMSI of the subscriber associated with UE 12b and may extract an MNC, MCC for the subscriber from the IMSI received from UE 12b. The MNC, MCC may be communicated to HNB-GW 24. Using the MNC, MCC and the mapping of various roaming relationships (e.g., successful CN, preferred CN), which can be maintained in network selection database 28, HNB-GW 24 can select an appropriate CN for the subsequent pre-R6 roamer UE 12b without cycling through each operator operating in the MOCN environment.

Thus, the solution provided by communication system 10 may provide several advantages for network selection of roamer pre-R6 UEs. For example, once network selection database 28 is populated, the solution may enable faster selection of an appropriate CN node to accept a location update/attach request for subsequent pre-R6 roamer UEs, which can reduce location update/attach procedure time to avoid or mitigate the risk of forbidding HNB access to pre-R6 roamer UEs, as these UEs might fail location update/attach procedures due to timeout. The mechanism may also reduce control plane signaling with multiple CN nodes for pre-R6 roamer users. In one or more embodiments, the solution can be enhanced to additionally maintain MNC, MCC and network selection information for post-R6 UEs (e.g., not operating as pre-R6 UEs), which can provide additional information to aid in selecting an appropriate CN for pre-R6 UEs based on the MNC and MCC matching described herein. In one or more other embodiments, the solution can further be enhanced to ensure commercially preferred roaming partners are selected in favor of load sharing across all possible (e.g., not barred) roaming partners. Without this enhancement, an HNB-GW could select non-preferred roaming partners for a proportion of inbound roamers, which could reduce the attractiveness of a wholesale MOCN small cell solution for mobile network operators. Consider an example involving a German (DE) Vodafone® (VF) subscriber. For example, assume a VF DE subscriber can roam with VF United Kingdom (UK), O2® and Everything Everywhere® EE in the UK. However, for commercial reasons, consider, for example that VF DE might prefer that VF UK is selected, if available, as a preferred roaming partner. When a given UE of a VF DE subscriber seeks connection to the small cell network under macro network 30, the UE may select a small cell (e.g., HNB 22) to perform a LAU, which may include an old location area identity (LAI) containing an MNC/MCC of the VF UK PLMN contained in the universal SIM (USIM) card housed in the UE.

In order to ensure a preferred CN (e.g., PLMN) selection, HNB-GW 24, via network selection module 26 and network selection database 28, could perform a statistical analysis for each inbound MNC/MCC for each home network PLMN to determine from where the majority of location area updates (LAUs) might originate. HNB-GW 24 can then query a preferred PLMN list maintained within network selection database 28 in order to determine and select the preferred roaming partner (e.g., VF UK) of an inbound roamer rather than load share across all possible roaming partners. In this manner, the solution provided by communication system 10 can provide an enhanced MOCN solution to automatically build and update roaming relationships, as needed, which can enhance NNSF operations to account for pre-R6 MOCN deployments. Thus, active management and updating of network selection database 28 may provide for dynamic CN selection possibilities in a MOCN environment, which may be preferable to using statically configured network selections based operator agreements that can often and quickly change between network operators.

In various embodiments, UE 12a-12b can be associated with users, employees, clients, customers, etc. wishing to initiate a flow in communication system 10 via some network. The terms 'user equipment,' 'mobile node,' 'end user,' 'user,' and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 10. UE 12a-12b may also be inclusive of a suitable interface to a human user such as a microphone, a display, a keyboard, or other terminal equipment.

UE 12a-12b may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12a-12b may have a bundled subscription for network access and application services (e.g., voice), etc. Once the access session is established, the user can register for application services as well, without additional authentication requirements. There can be two different user data repositories (e.g., AAA databases, whitelist databases, etc.): one for the access user profile and one for the application user profile. IP addresses can be assigned using dynamic host configuration protocol (DHCP), Stateless Address Auto-configuration, default bearer activation, etc., or any suitable variation thereof.

HNB 22 can offer suitable connectivity to one or more UE 12a-12b using any appropriate protocol or technique. In general terms, HNB 22 represents a radio access point device that can allow UEs to connect to a wired network using Wi-Fi, Bluetooth™, WiMAX, 4G/LTE, or any other appropriate standard. Hence, the broad term 'radio access point' can be inclusive of a wireless access point (WAP), a femtocell, a hotspot, a picocell, a WiFi array, a wireless bridge (e.g., between networks sharing same Service Set Identifier (SSID) and radio channel), a wireless local area network (LAN), an HeNB, an HNB, or any other suitable access device, which may be capable of providing suitable connectivity to a given UE 12a-12b. In certain cases, the access point can connect to a router (via a wired network), which can relay data between the UE and other UE of the network.

As shown in FIG. 1, HNB 22 and HNB-GW 24 respective processors 14a-14b and respective memory elements 16a-16b. Hence, appropriate software and/or hardware is being provisioned in HNB 22 and HNB-GW 24 in order to facilitate CN selection in a MOCN environment. Note that in certain examples, certain databases (e.g., for storing MNC/MCC information, CN information, preferred partner CN information, etc.) can be consolidated with memory elements (or vice versa), or the storage can overlap/exist in any other suitable manner.

In one example implementation, HNB 22 and HNB-GW 24 are network elements, which are meant to encompass network appliances, servers, routers, switches, gateways, bridges, loadbalancers, firewalls, processors, modules, or any other suitable device, component, element, or object operable to exchange information that facilitates or otherwise helps coordinate CN selection activities (e.g., for networks such as those illustrated in FIG. 1). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 10, each of HNB 22 and HNB-GW 24 can include memory elements for storing information to be used in achieving the CN selection operations, as outlined herein. Additionally, each of these devices may include a processor that can execute software or an algorithm to perform the CN selection activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to or by HNB 22 and/or HNB-GW 24 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and user equipment (e.g., mobile nodes) can also include suitable interfaces for receiving, transmitting, and/or otherwise communicating data or information in a network environment.

Note that in certain example implementations, the CN selection functions as outlined herein may be implemented by logic encoded in one or more tangible media, which may be inclusive of non-transitory media (e.g., embedded logic provided in an ASIC, in DSP instructions, software [potentially inclusive of object code and source code] to be executed by a processor, or other similar machine, etc.). In some of these instances, memory elements [as shown in FIG. 1] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 2A:
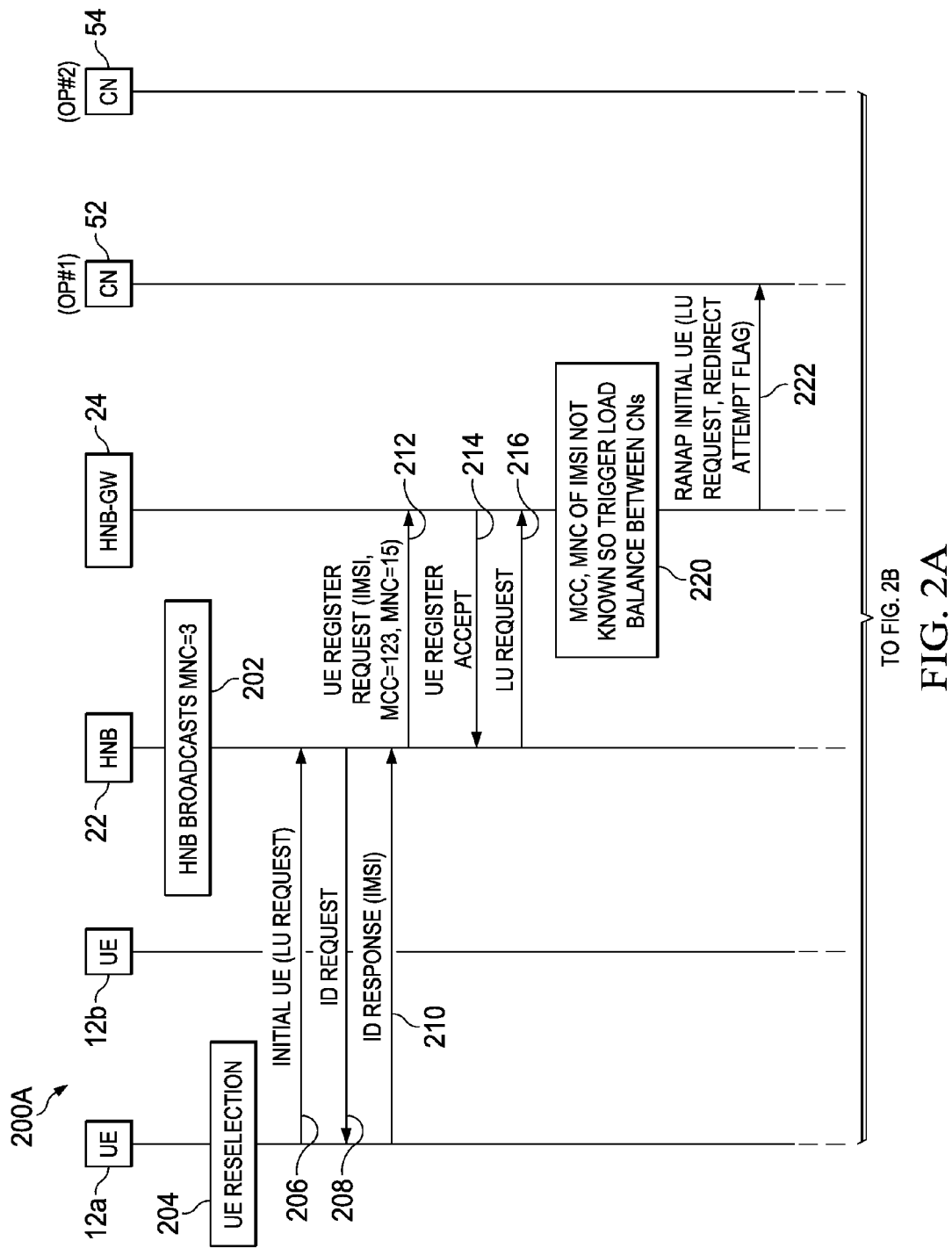
FIGS. 2A-2B are simplified flow diagrams illustrating example flows and activities associated with small cell gateway core network selection in a MOCN in accordance with one potential embodiment of the present disclosure.
Figure 2B:
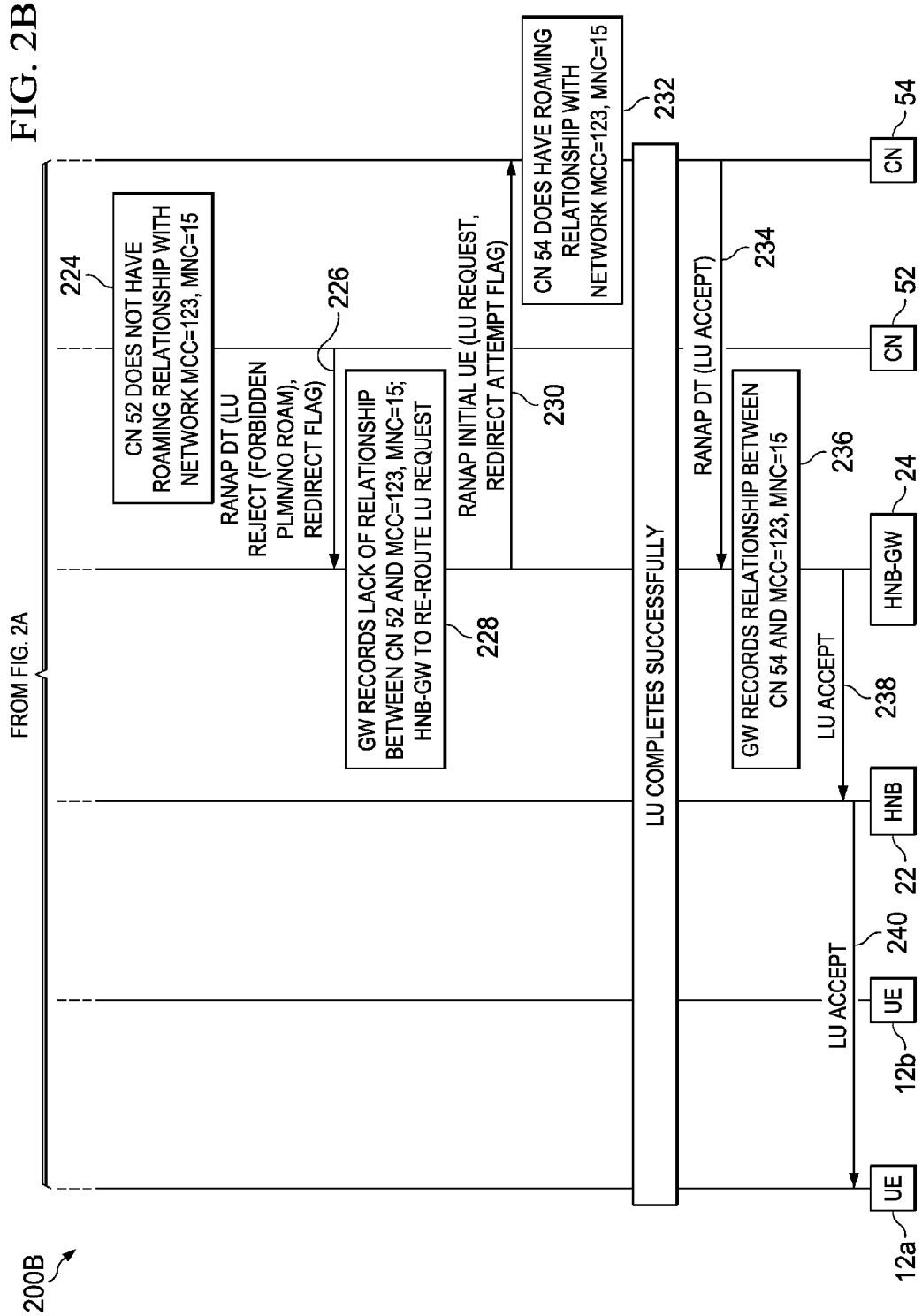

Referring to FIGS. 2A-2B, FIGS. 2A-2B are simplified flow diagrams 200A-200B, respectively, that illustrate example flows and activities associated with core network selection in a MOCN environment according to an embodiment of communication system 10. In FIGS. 2A-2B, 3A-3B and 4A-4C the flows of data and activities represented show the flow of data between the components and activities performed by certain components within communication system 10 as shown in FIG. 1, including UE 12a, UE 12b, HNB 22, HNB-GW 24 (including network selection module 26 and network selection database 28), CN 52 (operated by operator #1) and CN 54 (operated by operator #2). In particular, FIGS. 2A-2B illustrates flows and activities that may be used for populating network selection database 28 maintained by HNB-GW 24. For purposes of illustration, it is assumed that UE 12a-12b are pre-R6 UEs (e.g., either actual pre-R6 UEs or a post-R6 UEs configured to operate as pre-R6 UEs) for the example flows and activities described in FIGS. 2A-2B, 3A-3B and 4A-4C.

In the example flow diagram 200A shown in FIG. 2A, at 202, HNB 22 may broadcast a particular MNC, say, for example, an MNC equal to three (3), which may be unique from MNCs broadcast for CNs 52 and 54. As used herein in this Specification, MNC values and MCC values may be referred to as 'MNC=' and 'MCC=' (e.g., MNC=3, as shown for HNB 22). At 204, UE 12a may trigger an attach attempt (e.g., reselection) to HNB 22 based, at least in part, on a determination that MNC=3 is not in a forbidden list maintained by UE 12a. A particular flow may begin at 206 with an initial UE message embedded with a LU request message being communicated from UE 12a to HNB 22. At 208, HNB 22 may respond with an identity (ID) request communicated to UE 12a. At 210, UE 12a may communicate an ID response including an IMSI of a subscriber associated with UE 12a to HNB 22. At 212, HNB 22 may communicate a UE register request to HNB-GW 24.

The UE register request may include the IMSI of the subscriber associated with UE 12a. The IMSI can include an MCC and MNC identifying a home network for the subscriber, say, for example a network identified by MCC=123 and MNC=15. At 214, HNB-GW may communicate a UE register accept message to HNB 22. In response, HNB 22 may communicate a LU request to HNB-GW 24 at flow 216. At 220, HNB-GW 24 may determine that MCC=123, MNC=15 of the IMSI is not known to be associated with CN 52 or CN 54 and may begin to load balance subscriber between CN 52 and CN 54. The determination that MCC=123, MNC=15 are not known to be associated with the CNs can include, among other activities, querying network selection database 28 (as shown in FIG. 1) to determine whether the network identified by MCC=123, MNC=15 are stored and/or associated with CN 52 and/or CN 54 in the database.

To load balance the subscriber between the CNs, HNB-GW 24 may communicate a radio access network application part (RANAP) initial UE message to CN 52 at flow 222. The initial UE message communicated to CN 52 may be embedded with a LU request message as well as a redirect attempt flag set to indicate an MOCN LU/attach request for a non-supported pre-R6 UE, which may indicate that CN 52 is to respond with an indication of whether the request should be rerouted to another CN (e.g., CN 54) or should be completed with a response back to UE 12a. By communicating the RANAP initial UE message to CN 52, it is meant that the message may be communicated to an SGSN (not shown), which may query other components such as, for example, an HLR and/or AAA element (neither shown) provided within CN 52 to determine if a roaming relationship exists with the network identified by the MNC, MCC of the subscriber.

The flows and activities from FIG. 2A may continue to flows and activities as shown in flow diagram 200B for FIG. 2B. At 224, a determination may be made that CN 52 (e.g., operator #1 providing resources/services via CN 52) does not have a roaming relationship with the network identified by MCC=123, MNC=15. At flow 226, a RANAP downlink transport (DT) message may be communicated from CN 52 (e.g., an SGSN or MSC within CN 52) to HNB-GW 24. THE RANAP DT message may be embedded with a LU reject message indicating no roaming relationship with CN 52 and the network MCC, MNC. The LU reject message may include the PLMN of CN 52 and the redirect attempt flag set to indicate that a redirect is needed for the subscriber.

At 228, HNB-GW 24 may record (e.g., store) the lack of a roaming relationship between CN 52 and network MCC=123, MNC=15. For example, HNB-GW 24 may store the lack of the roaming relationship in network selection database 28 for use in subsequent LU/attach requests for subsequent pre-Rel. 6 UEs. At flow 230, HNB-GW 24 may communicate another RANAP initial UE message, embedded with the LU request message and a redirect attempt flag placeholder, to CN 54. At 232, a determination may be made that CN 54 (e.g., operator #2 providing resources/services via CN 54) does have a roaming relationship with the network identified by MCC=123, MNC=15, and, thus the LU may complete successfully between the subscriber and CN 54, as discussed below.

At flow 234, a RANAP DT message, which may be embedded with a LU accept message may be communicated from CN 54 (e.g., an SGSN or MSC within CN 54) to HNB-GW 24. At 236, HNB-GW 24 may record the successful roaming relationship between CN 54 and the network identified by MCC=123, MNC=15. For example, HNB-GW 24 may store the relationship in network selection database 28 for use in subsequent LU/attach requests for subsequent pre-Rel. 6 UEs. At 238, HNB-GW may communicate the LU accept message to HNB 22 and, at 240, HNB 22 may communicate the LU accept to UE 12a.

Figure 3A:
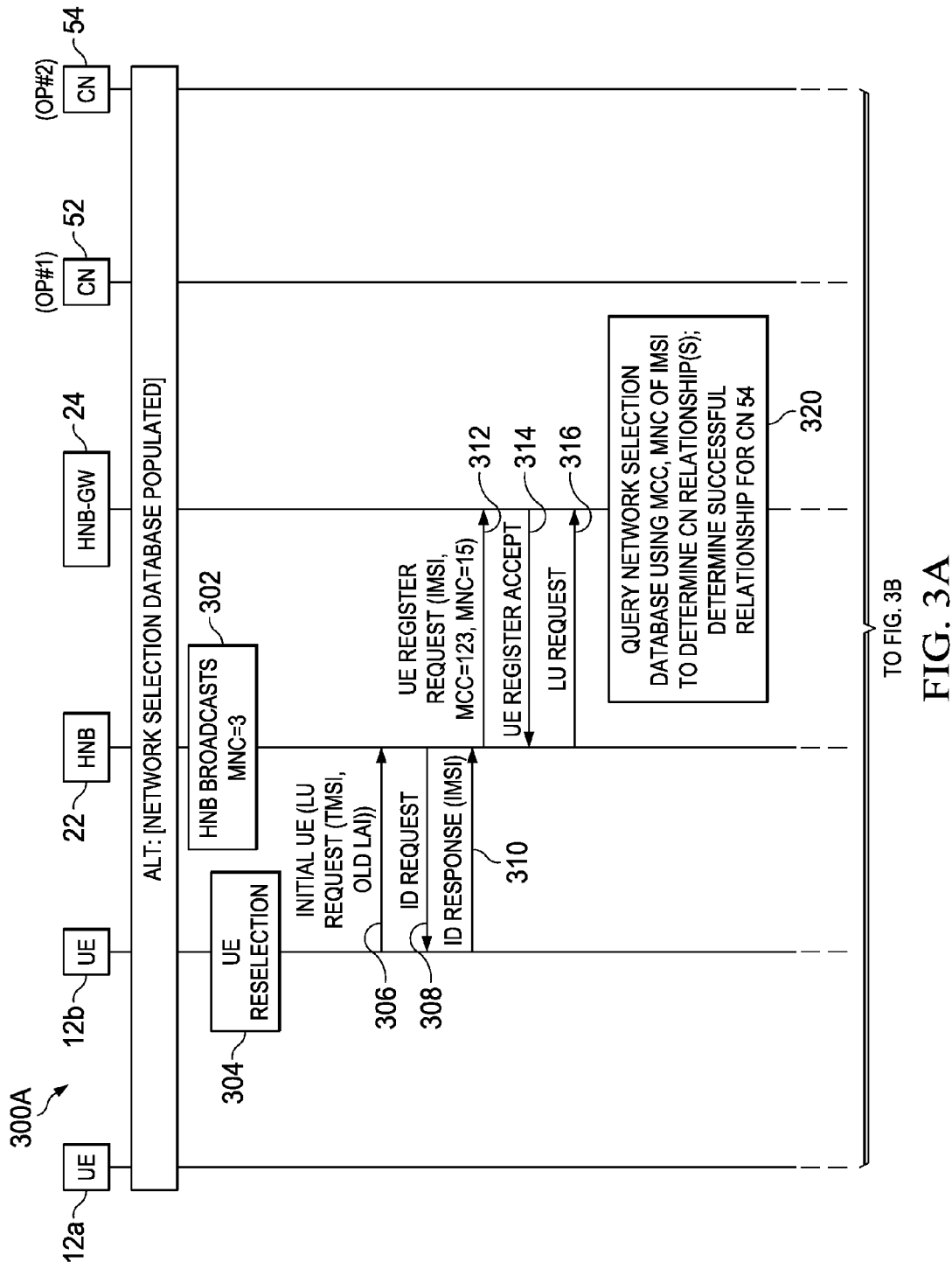
FIGS. 3A-3B are simplified flow diagrams illustrating other example flows and activities associated with small cell gateway core network selection in a MOCN in accordance with one potential embodiment of the present disclosure.
Figure 3B:
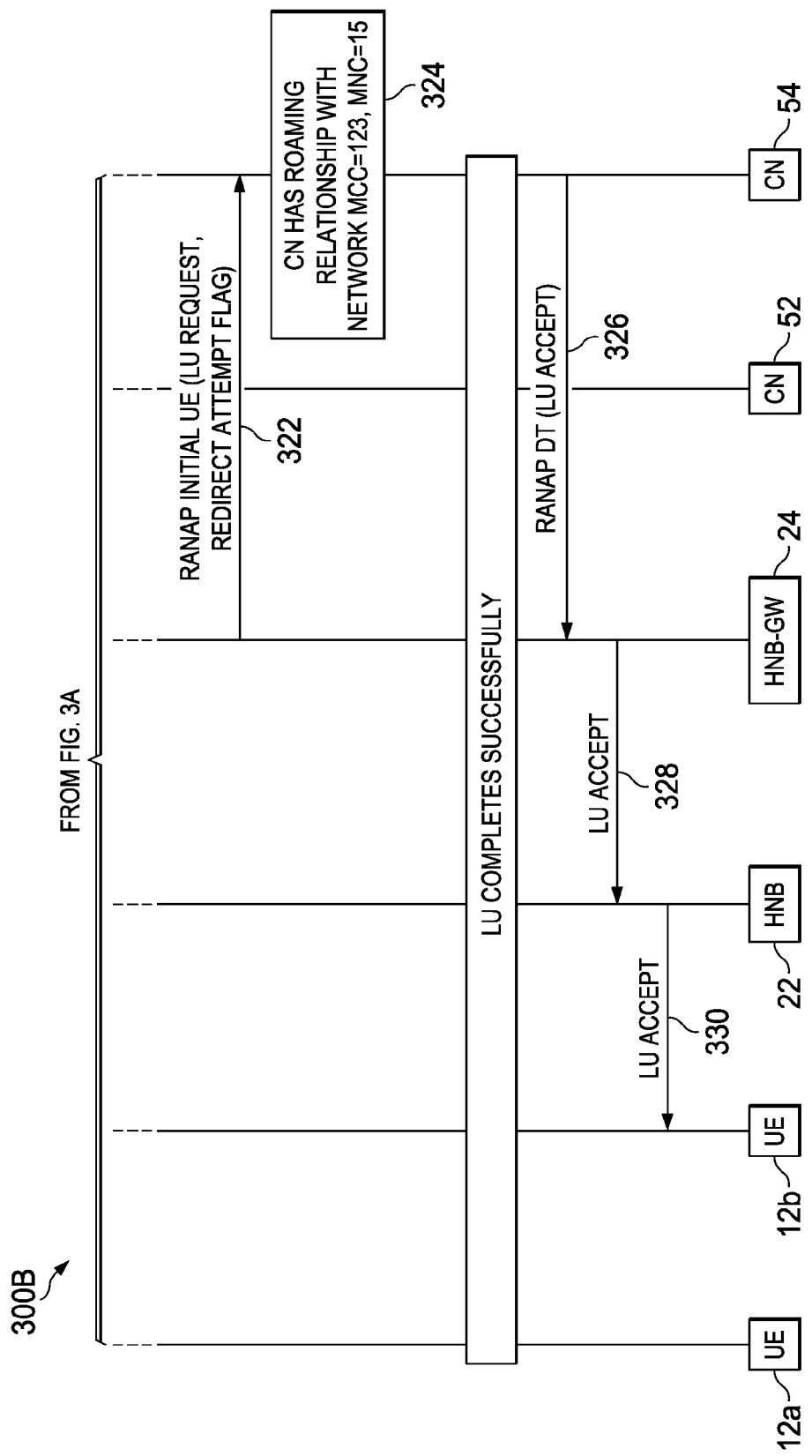

Referring to FIGS. 3A-3B, FIGS. 3A-3B are simplified flow diagrams 300A-300B, respectively, that illustrate example flows and activities associated with CN selection in a MOCN environment according to an embodiment of communication system 10. In particular, FIGS. 3A-3B illustrates flows and activities that may be used in querying network selection database 28 [as shown in FIG. 1] maintained by HNB-GW 24 in order to select a CN for a subscriber associated with UE 12b, which may be a pre-R6 UE (e.g., an actual pre-R6 UE or a post-R6 UE configured to operate as a pre-R6 UE). In the example flow diagram 300A shown in FIG. 3A, flows and activities illustrated at 302, 304, 306, 308, 310, 312, 314 and 316 may generally correspond to flows and activities 202, 204, 206, 208, 210, 212, 214 and 216 as described for FIG. 2A. For example, UE 12b may trigger reselection to HNB 22, which may be broadcasting MNC=3, and an exchange of messages may be communicated between UE 12b, HNB 22 and HNB-GW 24 to communicate an IMSI of a subscriber associated with UE 12b, as well as an MCC, MNC extracted from the IMSI, to HNB-GW 24. For purposes of illustration, it is assumed for the present example that MCC=123 and MNC=15 for the subscriber associated with UE 12b. It should be understood, however, that the solution provided by communication system 10, as shown in FIG. 1, may be applicable to any combination of MCC, MNC for various subscribers within the system.

At 320, HNB-GW 24 may query network selection database 28 with MCC=123, MNC=15 extracted from the IMSI of the subscriber associated with UE 12b. Based on the query, HNB-GW 24 may determine that no roaming relationship exists with CN 52 (e.g., operator #1) for the network identified by MCC=123, MNC=15; thus, CN 52 may be excluded from any load balancing algorithm for determining a CN to which to attach UE 12b. Additionally based on the query, HNB-GW 24 may determine that a successful roaming relationship does exist between the network identified by MCC=123, MNC=15 and CN 54; thus, a first LU attempt may be made with CN 54 to load balance the subscriber.

Although only two CNs are illustrated in FIGS. 2A-2B, 3A-3B and 4A-4C, it should be understood that many CNs may be available for load balancing subscribers across in a MOCN environment. The flows and activities from FIG. 3A may continue to flows and activities as shown in flow diagram 300B for FIG. 3B. Based on the roaming relationship information gathered from the query, HNB-GW 24 may, at flow 322, communicate a first RANAP initial UE message to CN 54 embedded with a LU request message and a redirect attempt flag set to indicate a LU request for a non-supported pre-R6 UE (e.g., UE 12b). At 324, a determination may be made (e.g., using an SGSN or MSC within CN 54) that a roaming relationship exists with the network identified by MCC=123, MNC=15; thus the LU may complete successfully between CN 54 and UE 12b. For example, at flow 326, a RANAP DT message, which may be embedded with a LU accept message may be communicated from CN 54 (e.g., an SGSN or MSC within CN 54) to HNB-GW 24. At 328, HNB-GW 24 may communicate the LU accept message to HNB 22 and, at flow 330, HNB 22 may communicate the LU accept to UE 12b.

Accordingly, the solution provided by communication system 10 [as shown in FIG. 1] may provide for faster selection of an appropriate CN (e.g., CN 54) to accept the LU for pre-R6 roamer UE 12b. The faster selection can reduce LU procedure time, which may aid in avoiding and/or mitigating the risk of UE 12b forbidding access to HNB 22, as UE 12b might otherwise fail the LU procedure due to timeout without the CN selection solution. The solution may also reduce control plane signaling between multiple CNs (e.g., CN 52, 54) for pre-R6 roamer UE 12b. Additionally, the solution can be enhanced, as described below, to ensure commercially preferred roaming partners (e.g., operators) are selected in favor of load sharing across all possible (e.g., not barred) roaming partners.

Figure 4A:
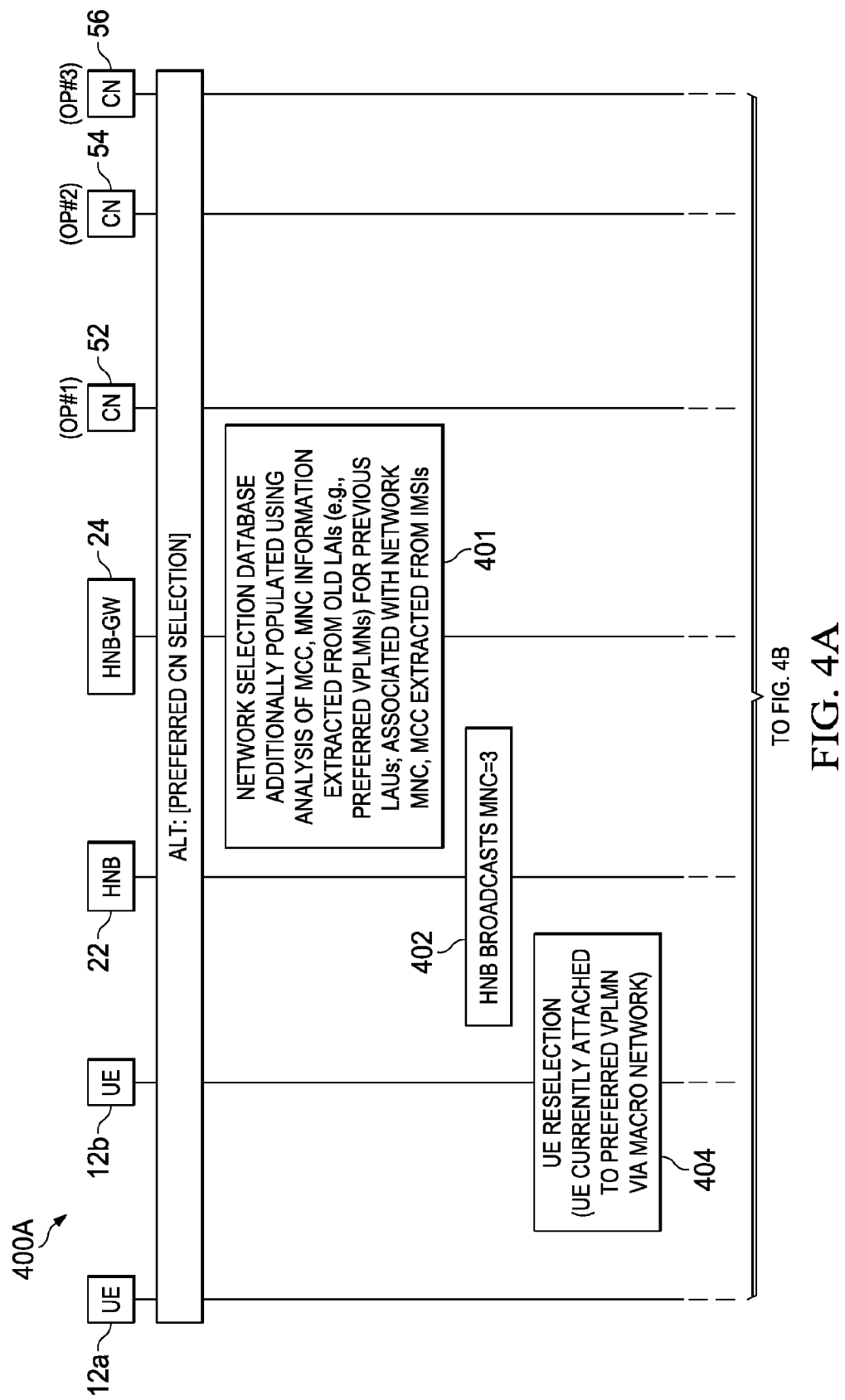
FIGS. 4A-4C are simplified flow diagrams illustrating yet other example flows and activities associated with small cell gateway core network selection in a MOCN environment in accordance with one potential embodiment of the present disclosure.
Figure 4B:
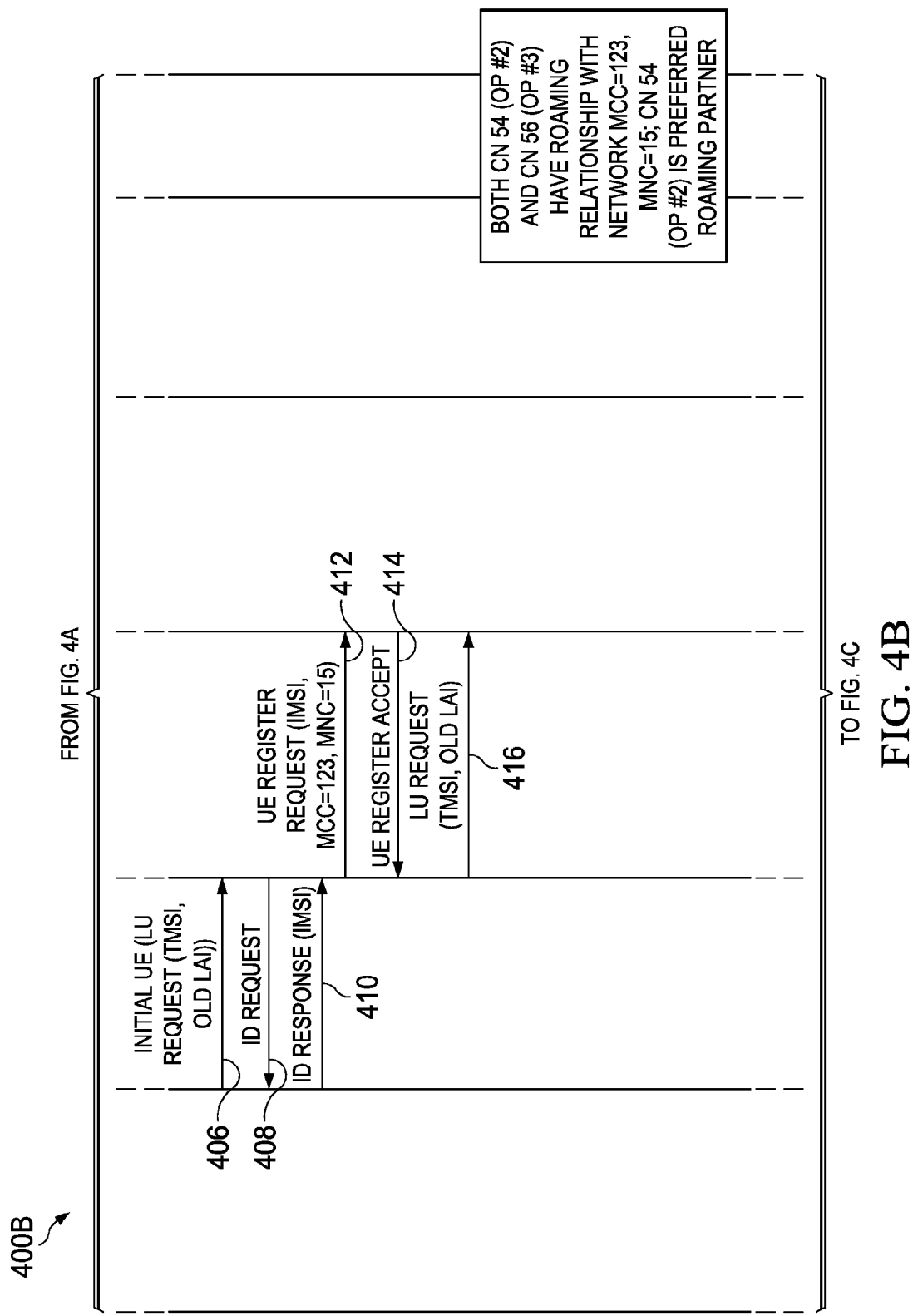
Figure 4C:
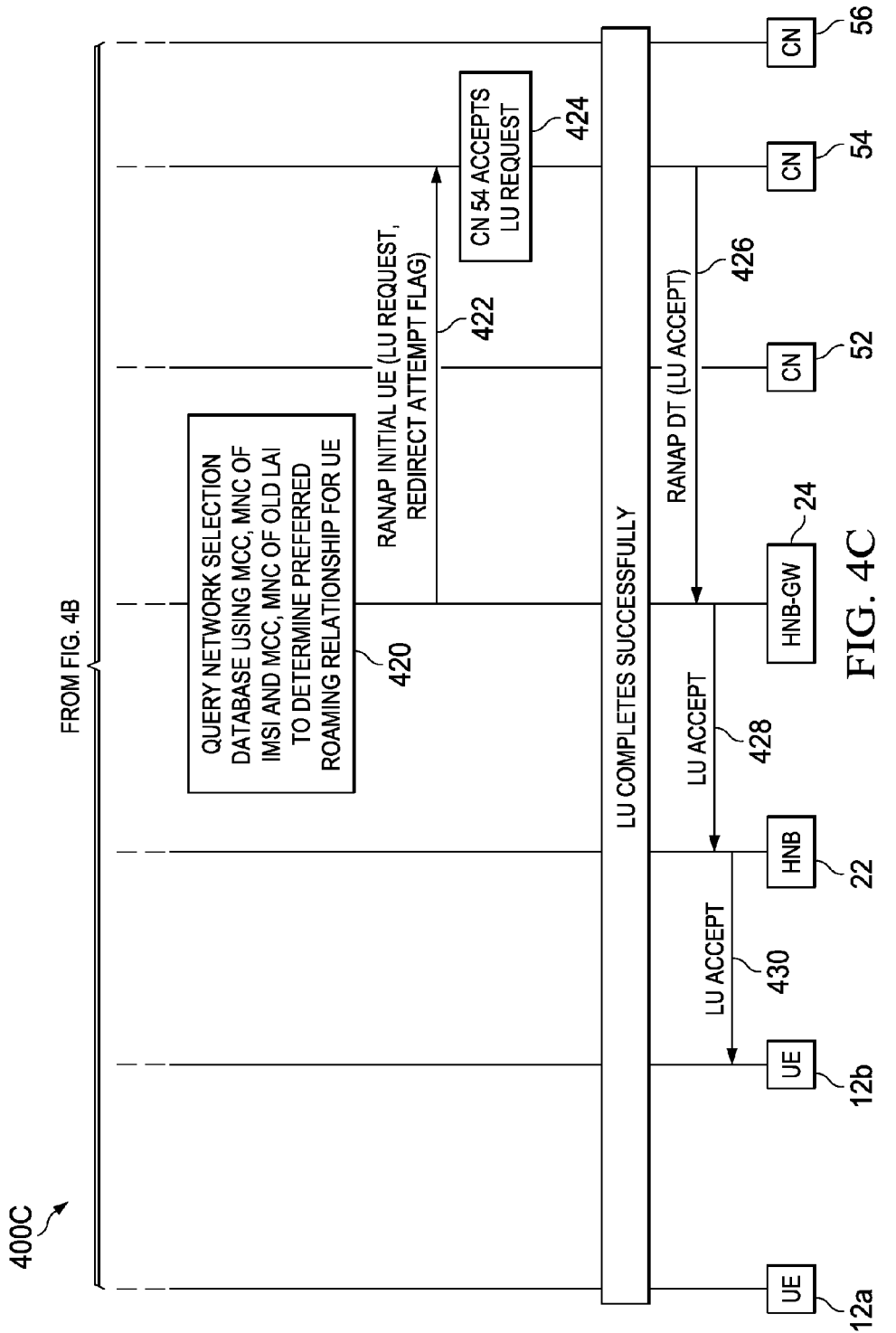

Referring to FIGS. 4A-4C, FIGS. 4A-4C are simplified flow diagrams 400A-400C, respectively, that illustrates example flows and activities associated with CN selection in a MOCN environment according to an embodiment of communication system 10. In particular, FIGS. 4A-4C illustrates flows and activities that may be used populating network selection database 28 [as shown in FIG. 1] with preferred CN information and using this preferred CN information to route LU/attach requests for pre-R6 UEs (e.g., UE 12b) in the MOCN environment. A third CN, CN 56, operated by an operator #3, is illustrated in FIGS. 4A-4C to illustrate certain features of the system.

In the example flow diagram 400A shown in FIG. 4A, at 401, HNB-GW 24 may, through analysis of MCC, MNC information extracted from old LAIs of previous LAUs for previous pre-R6 UEs, populate network selection database 28 with preferred CN selection information. The old LAIs from the previous LAUs may identify last visited PLMNs (VPLMNs) for each of the previous UEs. Recall, PLMNs (and VPLMNs) may be identified using a particular MCC, MNC combination. The last VPLMNs (e.g., MCC, MNC) may be additionally associated with MCC, MNC information extracted from IMSIs of subscribers associated with the previous pre-R6 UEs and correlated together with preferred CN selections for the previous UEs, which can be used to ensure commercially preferred roaming partners (e.g., operators) are selected for LU/attach request procedures of subsequent UEs (e.g., UE 12b) in favor of load sharing across all possible (e.g., not barred) roaming partners in the MOCN environment.

In various embodiments, preferred CN selection information may include information representing a most popular (or most often) selected CN for a certain MNC/MCC combination. In various embodiments, network selection database 28 can also be updated, if necessary, as roaming relationships may change between network operators. For example, in one embodiment, preferred CN selection information as well as denied CN information may be periodically aged-out (e.g., using a configurable daily, monthly, etc. timer), which may provide a mechanism for periodically updating preferred and/or denied CN selection information for various MNC/MCC combinations. This may help to ensure that network selection database 28 reflects any update to preferred roaming partners, roaming partner agreements, etc.

In the example shown in FIG. 4A, at 402, HNB 22 may broadcast a particular MNC, say, for example, an MNC=3, which may be unique from MNCs broadcast for CNs 52 and 54. At 404, UE 12b may trigger an attach attempt (e.g., reselection) to HNB 22 based, at least in part, on a determination that MNC=3 is not in a forbidden list maintained by UE 12b. UE 12b may currently be attached to a preferred VPLMN via macro network 30, as shown in FIG. 1. The activities from FIG. 4A may continue to flows and activities as shown in flow diagram 400B for FIG. 4B. A particular flow may begin at 406 with an initial UE message embedded with LU request including a Temporary Mobile Subscriber Identity (TMSI) of the subscriber associated with UE 12b and an old LAI for the last VPLMN to which UE 12b is currently attached.

At 408, HNB 22 may respond with an ID request communicated to UE 12b. At 410, UE 12b may communicate an ID response including an IMSI of a subscriber associated with UE 12b to HNB 22. At 412, HNB 22 may communicate a UE register request to HNB-GW 24, including the IMSI of the subscriber associated with UE 12b. The IMSI of the subscriber can include an MCC and MNC identifying a home network for the subscriber, say, for example MCC=123 and MNC=15. At 414, HNB-GW may communicate a UE register accept message to HNB 22. At 416, HNB 22 may communicate a LU request including the TMSI and old LAI to HNB-GW 24. For purposes of the present example, it is assumed that both CN 54 and CN 56 may have a roaming relationship with the network identified by MCC=123, MNC=1, thus HNB-GW 24 may load balance UE 12b between CN 54 and CN 56. A statistical analysis of old LAIs for last VPLMNs for previous subscribers having a home network MCC=123, MNC=15 as well as the record of successful/unsuccessful reroutes for the previous subscribers may indicate that CN 54 may be the preferred roaming partner for MCC=123, MNC=15 (e.g., CN 54 is the most often selected CN and successfully routed CN by subscribers having a home network MCC=123, MNC=15).

The flows and activities from FIG. 4B may continue to flows and activities as shown in flow diagram 400C for FIG. 4C. At 420, HNB-GW 24 may query network selection database 28 using the MCC, MNC of the IMSI as well as the MCC, MNC of the last VPLMN to determine a preferred CN roaming relationship for UE 12*b*. At 422, based on the preferred roaming relationship information gathered from the query, HNB-GW 24 may communicate a first RANAP initial UE message to CN 54 embedded with a LU request message and a redirect attempt flag set to indicate a LU request for a non-supported pre-R6 UE (e.g., UE 12*b*). At 424, CN 54 (e.g. an SGSN or MSC within CN 54) may accept the LU request and the LU may complete successfully. For example, at flow 426, a RANAP DT message, which may be embedded with a LU accept message may be communicated from CN 54 (e.g. an SGSN or MSC within CN 54) to HNB-GW 24. At 428, HNB-GW 24 may communicate the LU accept message to HNB 22 and, at 430, HNB 22 may communicate the LU accept to UE 12*b*.

Turning to FIG. 5, FIG. 5 is a simplified flow diagram 500 illustrating example operations associated with core network selection in a MOCN environment in one example operation of communication system 10. In one particular embodiment, these operations may involve a given pre-R6 UE (e.g., UE 12*a* or 12*b* either being an actual pre-R6 UE or a post-R6 UE configured to operate as a pre-R6 UE), HNB 22, HNB-GW 24, including network selection module 26 and network selection database 28, CN 52 and CN 54 as shown in FIG. 1.

Processing may start at 510 when HNB 22 may receive a LU and/or attach request from the UE. At 512, HNB-GW 24 may query, via network selection module 26, network selection database 28 using an MCC, MCC of an IMSI for a subscriber associated with the UE. In an embodiment, an old LAI may be included in the query at 514 if preferred CN selection information may be maintained in network selection database 28. For example, network selection database may be populated with MCC, MNC (e.g., last VPLMN) information from old LAIs from previous pre-R6 UEs attempting to attach to HNB 22 (or another HNB within the small cell network), which, through various statistical analyses, can be used to determine preferred roaming partners between networks.

Returning to FIG. 5, at 516, HNB-GW 24 may determine, via network selection module 26, whether the MCC, MNC of the subscriber's IMSI is contained within network selection database. If it is not included in the database, HNB-GW 24 may attempt to re-route the UE to CNs (e.g., CN 52, CN 54, etc.) within the system to determine a CN (e.g., operator) having a roaming relationship with the subscriber's home network. For example, at 520, HNB-GW can attempt the LU/attach request with a given CN. At 522, a determination is made whether or not to accept the UE by the given CN. If the CN does not accept the UE, a record of the rejection, including the MCC, MNC of the subscriber's IMSI and an ID of the CN rejecting the request, is stored in network selection database 28 at 526. At 528, another CN is chosen by HNB-GW 24 to re-direct the LU/attach request and the processing continues (e.g., return to 520). The processing may continue until a particular CN accepts the LU/attach request.

Upon a successful redirect of the LU/attach request, at 524, a record may be stored in network selection database 28 including the MCC, MNC of the subscriber's IMSI and an ID of the CN accepting the request to indicate a successful roaming relationship between the network identified by the MCC, MNC and the CN accepting the request. In an embodiment, an analysis may be performed at 530 using an MCC, MNC of an old LAI for the UE, which can be used to populate preferred CN selection information in network selection database 28. At 560, the LU/attach can complete between the CN and the UE.

Returning to the processing at 516, in another example, HNB-GW 24 may determine that the MCC, MNC of the subscriber's IMSI is contained within network selection database 28. In this case, HNB-GW 24 may retrieve CNs (e.g., IDs for CNs) having a successful roaming relationship with the network identified by the MCC, MNC of the subscriber's IMSI. In one or more embodiments, one or several CNs may be retrieved at 540 having a roaming relationship with the network MCC, MNC (e.g., using a look-up on the MCC, MNC). At 542, it can be determined whether one or multiple CNs may have a roaming relationship with the network identified by MCC, MNC of the subscriber's IMSI.

If only one roaming relationship for a given CN is retrieved, then HNB-GW 24 may select the corresponding CN to direct the LU/attach request at 544. The corresponding CN may accept or reject the LU/attach request at 550. If the corresponding CN accepts the UE, the LU/attach request procedure can complete successfully at 560. If, however, the corresponding CN rejects the UE (e.g., roaming relationships have changed between network operators), network selection database 28 may be updated with the rejection (return to 526) and the LU/attach request may be redirected to another CN at 528 and the process for attempting to attach the UE to another network may continue at 520. In this manner, network selection database can be dynamically and automatically updated within the system as roaming agreements/relationships may change between network operators.

Returning to the processing at 542, if multiple CNs may have a roaming relationship with the MCC, MNC of the subscriber's IMSI, then HNB-GW 24 may attempt to load balance the UE between the possible CNs at 544. In an embodiment, at 580, HNB-GW 24 may determine a preferred CN from the multiple possible CNs using an analysis of MCC, MNC (e.g., last VPLMN) information contained in an old LAI for the UE to direct the LU/attach request. At 546, HNB-GW 24 may select a corresponding CN having a roaming relationship (e.g., either through load balancing or determining a preferred relationship) with the network identified by the MCC, MNC of the subscriber's IMSI. The corresponding CN may accept or reject the LU/attach request at 550. If the corresponding CN accepts the UE, the LU/attach request procedure can complete successfully at 560. If, however, the corresponding CN rejects the UE (e.g., roaming relationships have changed between network operators), network selection database 28 may be updated with the rejection (return to 526) and the LU/attach request may be redirected to another CN at 528 and the process for attempting to attach the UE to another network may continue at 520. Again, in this manner, network selection database can be dynamically and automatically updated within the system as roaming agreements/relationships may change between network operators.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding flows and activities have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for a communication network comprising:
receiving, for a small cell network, a first communication from a first user equipment (UE) for a first subscriber associated with the first UE, wherein a plurality core networks (CNs) share resources for the small cell network;
determining that a first Mobile Country Code (MCC) and a first Mobile Network Code (MNC) for the first subscriber are not known to be associated with any of the plurality of CNs;
determining a first CN from the plurality of CNs to provide services to the first subscriber via the small cell network based, at least in part, on the first MCC and the first MNC for the first subscriber;
storing, in at least one memory element, at least one association of the first MCC and the first MNC to the first CN for use in subsequent communications from other UEs for other subscribers; and
storing a record of one or more CNs for which the first subscriber has been denied access for use with subsequent communications from other UEs for other subscribers, wherein the record is maintained according to the MCC and the MNC for the first subscriber.

2. The method of claim 1, further comprising:
determining a last visited Public Land Mobile Network (VPLMN) for the first subscriber, wherein the last VPLMN comprises a second MCC and second MNC contained in the last VPLMN;
determining the first CN selected based additionally on the second MCC and second MNC contained in the last VPLMN for the first subscriber; and
storing another association of the second MCC and the second MNC to the first CN, wherein the other association indicates a preferred selection of the first CN for use in subsequent communications from other UEs for other subscribers, the other UEs having a last VPLMN matching the last VPLMN determined from the first subscriber.

3. The method of claim 2, wherein the last VPLMN for the first subscriber is determined from a location area identifier (LAI) received from the first UE.

4. The method of claim 1, further comprising:
receiving, for the small cell network, a second communication from a second UE for a second subscriber associated with the second UE; and
selecting the first CN to provide services to the second subscriber based, at least in part, on the at least one association if a second MCC and a second MNC of the second subscriber match the first MCC and the first MNC of the first subscriber.

5. The method of claim 4, wherein the first UE and the second UE are both 3rd Generation Partnership Project (3GPP) pre-Release 6 UEs.

6. The method of claim 4, wherein the first communication or the second communication are at least one of:
an attach request for at least one of the first UE and the second UE; and
a location area update (LAU) for at least one of the first UE and the second UE.

7. The method of claim 1, further comprising:
updating the at least one stored association of the first MCC and the first MNC to the first CN if a subsequent UE having an MCC and MNC matching the first MCC and the first MNC is denied access to the first CN.

8. One or more non-transitory tangible media encoding logic that include instructions for execution that, when executed by a processor, is operable to perform operations comprising:
receiving, for a small cell network, a first communication from a first user equipment (UE) for a first subscriber associated with the first UE, wherein a plurality core networks (CNs) share resources for the small cell network;
determining that a first Mobile Country Code (MCC) and a first Mobile Network Code (MNC) for the first subscriber are not known to be associated with any of the plurality of CNs;
determining a first CN from the plurality of CNs to provide services to the first subscriber via the small cell network based, at least in part, on the first MCC and the first MNC for the first subscriber; and
storing, in at least one memory element, at least one association of the first MCC and the first MNC to the first CN for use in subsequent communications from other UEs for other subscribers; and
storing a record of one or more CNs for which the first subscriber has been denied access for use with subsequent communications from other UEs for other subscribers, wherein the record is maintained according to the MCC and the MNC for the first subscriber.

9. The media of claim 8, the operations further comprising:
- determining a last visited Public Land Mobile Network (VPLMN) for the first subscriber, wherein the last VPLMN comprises a second MCC and second MNC contained in the last VPLMN;
- determining the first CN selected based additionally on the second MCC and second MNC contained in the last VPLMN for the first subscriber; and
- storing another association of the second MCC and the second MNC to the first CN, wherein the other association indicates a preferred selection of the first CN for use in subsequent communications from other UEs for other subscribers, the other UEs having a last VPLMN matching the last VPLMN determined from the first subscriber.

10. The media of claim 9, wherein the last VPLMN is determined from a location area identifier (LAI) received from the first UE.

11. The media of claim 8, the operations further comprising:
- receiving, for the small cell network, a second communication from a second UE for a second subscriber associated with the second UE; and
- selecting the first CN to provide services to the second subscriber based, at least in part, on the at least one association if a second MCC and a second MNC of the second subscriber match the first MCC and the first MNC of the first subscriber.

12. The media of claim 11, wherein the first communication or the second communication are at least one of:
- an attach request for at least one of the first UE and the second UE; and
- a location area update (LAU) for at least one of the first UE and the second UE.

13. The media of claim 8, the operations further comprising:
- updating the at least one stored association of the first MCC and the first MNC to the first CN if a subsequent UE having an MCC and MNC matching the first MCC and the first MNC is denied access to the first CN.

14. An apparatus, comprising:
- a first Home Node B (HNB);
- a memory element for storing data; and
- a processor that executes instructions associated with the data, wherein the processor and memory element cooperate such that the apparatus is configured for:
  - receiving, for a small cell network, a first communication from a first user equipment (UE) for a first subscriber associated with the first UE, wherein a plurality core networks (CNs) share resources for the small cell network;
  - determining at an HNB Gateway (HNB-GW) that a first Mobile Country Code (MCC) and a first Mobile Network Code (MNC) for the first subscriber are not known to be associated with any of the plurality of CNs;
  - determining a first CN from the plurality of CNs to provide services to the first subscriber via the small cell network based, at least in part, on the first MCC and the first MNC for the first subscriber; and
  - storing, in at least one memory element, at least one association of the first MCC and the first MNC to the first CN for use in subsequent communications from other UEs for other subscribers; and
  - storing a record of one or more CNs for which the first subscriber has been denied access for use with subsequent communications from other UEs for other subscribers, wherein the record is maintained according to the MCC and the MNC for the first subscriber.

15. The apparatus of claim 14, the apparatus being further configured for:
- determining a last visited Public Land Mobile Network (VPLMN) for the first subscriber, wherein the last VPLMN comprises a second MCC and second MNC contained in the last VPLMN;
- determining the first CN selected based additionally on the second MCC and second MNC contained in the last VPLMN for the first subscriber; and
- storing another association of the second MCC and the second MNC to the first CN, wherein the other association indicates a preferred selection of the first CN for use in subsequent communications from other UEs for other subscribers, the other UEs having a last VPLMN matching the last VPLMN determined from the first subscriber.

16. The apparatus of claim 15, wherein the first VPLMN is determined from a location area identifier (LAI) received from the first UE.

17. The apparatus of claim 14, the apparatus being further configured for:
- receiving, for the small cell network, a second communication from a second UE for a second subscriber associated with the second UE; and
- selecting the first CN to provide services to the second subscriber based, at least in part, on the at least one association if a second MCC and a second MNC of the second subscriber match the first MCC and the first MNC of the first subscriber.

18. The apparatus of claim 17, wherein the first UE and the second UE are both 3rd Generation Partnership Project (3GPP) pre-Release 6 UEs.

\* \* \* \* \*